US007029299B1

(12) United States Patent
Chen

(10) Patent No.: US 7,029,299 B1
(45) Date of Patent: Apr. 18, 2006

(54) ELECTRICAL CARD CONNECTOR

(75) Inventor: Chiu-Kuei Chen, Hsinchuang (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 10/972,373

(22) Filed: Oct. 26, 2004

(51) Int. Cl.
*H01R 13/62* (2006.01)

(52) U.S. Cl. .................................................... 439/159

(58) Field of Classification Search ................ 439/630, 439/946, 159, 160, 152; 361/756
See application file for complete search history.

(56) References Cited

U.S. PATENT DOCUMENTS 6,648,694 B1 * 11/2003 Takamori et al. ........... 439/630
6,655,973 B1 * 12/2003 Ji et al. ...................... 439/159
6,776,632 B1 * 8/2004 Kikuchi et al. ............. 439/159
6,948,960 B1 * 9/2005 Chen .......................... 439/159
6,951,471 B1 * 10/2005 Chen .......................... 439/159
6,962,500 B1 * 11/2005 Chen .......................... 439/159

* cited by examiner

*Primary Examiner*—Tho D. Ta
*Assistant Examiner*—Vanessa Girardi
(74) *Attorney, Agent, or Firm*—Rosenberg, Klein & Lee

(57) ABSTRACT

An electrical card connector, in which a shielding member introduced therein has a tab using for abutting against a top of a guide rod so as to limit an upward displacement of the guide rod. This configuration can prevent the guide rod from shaking up and down. The guide rod is thus securely fixed. On the other hand, the guide rod further includes a guide groove slideably mated with a corresponding guide rib of an insulating housing, which make the slider slide reliably in a front-to-back direction. Moreover, the slider further includes a spring switching for abutting against and fixing an inserted electrical card. Thereby, the electrical cards can be engaged in the receiving cavity reliably.

7 Claims, 6 Drawing Sheets

ELECTRICAL CARD CONNECTOR

BACKGROUND OF THE INVENTION

1. Field of the Invention

The present invention relates to an electrical card connector, and particularly to an electrical card connector mounted on a Printed Circuit Board (PCB) for retaining an electrical card therein.

2. Description of Related Art

Recently, electrical cards are widely used in the field of electronic appliances. Electrical card connectors are adapted to connect the electrical cards to the appliances, in which the electrical card connectors are mounted on a PCB of the appliances and electrical cards are retained therein, so that information can be transferred therebetween.

Referring to FIG. 1, a conventional electrical card connector is shown, which includes an insulating housing 1, a plurality of conductive terminals 2, and an ejector 3. The insulating housing 1 has a base portion 11, a first side arm 12 and a second side arm 13 extending parallel to each other from two ends of the base portion 11, respectively, so as to form a receiving cavity 14 for retaining an electrical card 4.

The conductive terminals 2 are arranged in the base portion 11 of the insulating housing 1. Each of the conductive terminals 2 includes a soldering portion extending from a bottom portion of the insulating housing 1 for electrically connecting to a PCB (not shown), and a contact portion extending through to the receiving cavity 14 for electrically connecting to the electrical card 4 introduced therein.

The ejector includes a slider 31, a spring 32, and a guide rod 33 fixed to the slider 31, in which the slider 31 can slide on the insulating housing 1 in a front-to-back direction. The insulating housing has a slide groove 34 therein, and one end (not labeled) of the guide rod 33 is slideably mated with the slide groove 34. The end of the guide rod 33 has two sliding tracks for sliding in the slide groove 34.

When being inserted or ejected, the electrical card 4 is pushed along a insertion direction, and the electrical card 4 pushes the slider 31. Insertion or ejection of the electrical card 4 is accomplished by sliding the guide rod 33 along the slide groove 34.

However, in the configuration of the conventional electrical card connector, the slider 31 is slideably engaged with the insulating housing 1; the slider is thus likely to shake up and down while sliding along the insulating housing. It is also likely that this configuration becomes flexible when the shaking is enhanced, which adversely affects the operation of the ejector 3 and the whole electrical card connector.

Moreover, when the electrical card 4 is inserted into the receiving cavity 14, the electrical card is not fixed stably to the electrical card connector. The electrical card thus cannot reliably electrically connect to the electrical card connector.

Furthermore, a front portion of the first side arm 12 and the second side arm 13 of the insulating housing 1 are formed free ends, respectively. The first and second side arms 12 and 13 are likely to be expanded or distorted when the electrical card 4 is inserted or ejected.

It is thus desirable to provide an improved electrical card connector for containing electrical cards that overcomes the above problems.

SUMMARY OF THE INVENTION

An object of the present invention is to provide an electrical card connector, which limits an upward displacement of the guide rod and prevents the guide rod from shaking up and down so as to make the guide rod slide stably and smoothly.

Another object of the present invention is to provide an electrical card connector, which reliably and electrically connects the electrical card thereto.

Another object of the present invention is to provide an electrical card connector with a stable configuration.

In order to achieve the objects set forth, an electrical card connector in accordance with the present invention includes an insulating housing having a receiving cavity. The insulating housing comprises a guide rib with a plurality of conductive terminals retained in the insulating housing. The insulating housing further comprises an ejector having a slider, a spring, and a guide rod. The slider slideably mates with the insulating housing along a front-to-back direction, and the slider has a slide groove therein and a guide groove in a bottom portion thereof. The guide groove slideably engages with the guide rib, and the spring is introduced between the insulating housing and the slider. The guide rod is secured to the insulating housing, and one end of the guide rod is movably mated with the slide groove. A spring switching is secured to the slider and extends into the receiving cavity. A shielding member is mounted on the insulating housing; the shielding member has a tab abutting against a top portion of the guide rod.

BRIEF DESCRIPTION OF THE DRAWINGS

Other objects, advantages, and novel features of the present invention will became more apparent from the following detailed description when taken in conjunction with the accompanying drawings, in which.

DETAILED DESCRIPTION OF PREFERRED EMBODIMENTS

Figure 1:
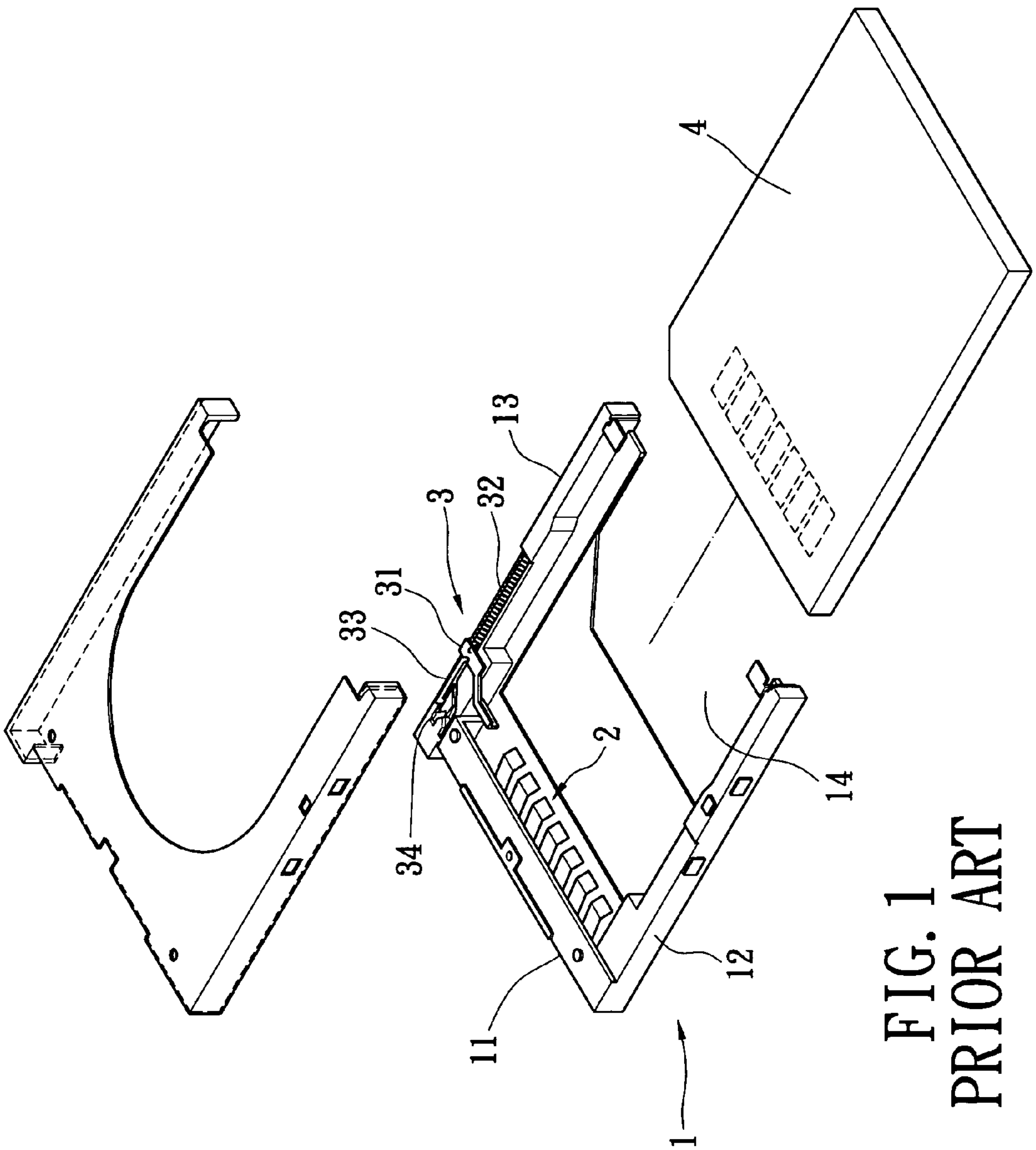
FIG. 1 is a perspective view of a conventional electrical card connector.
Figure 2:
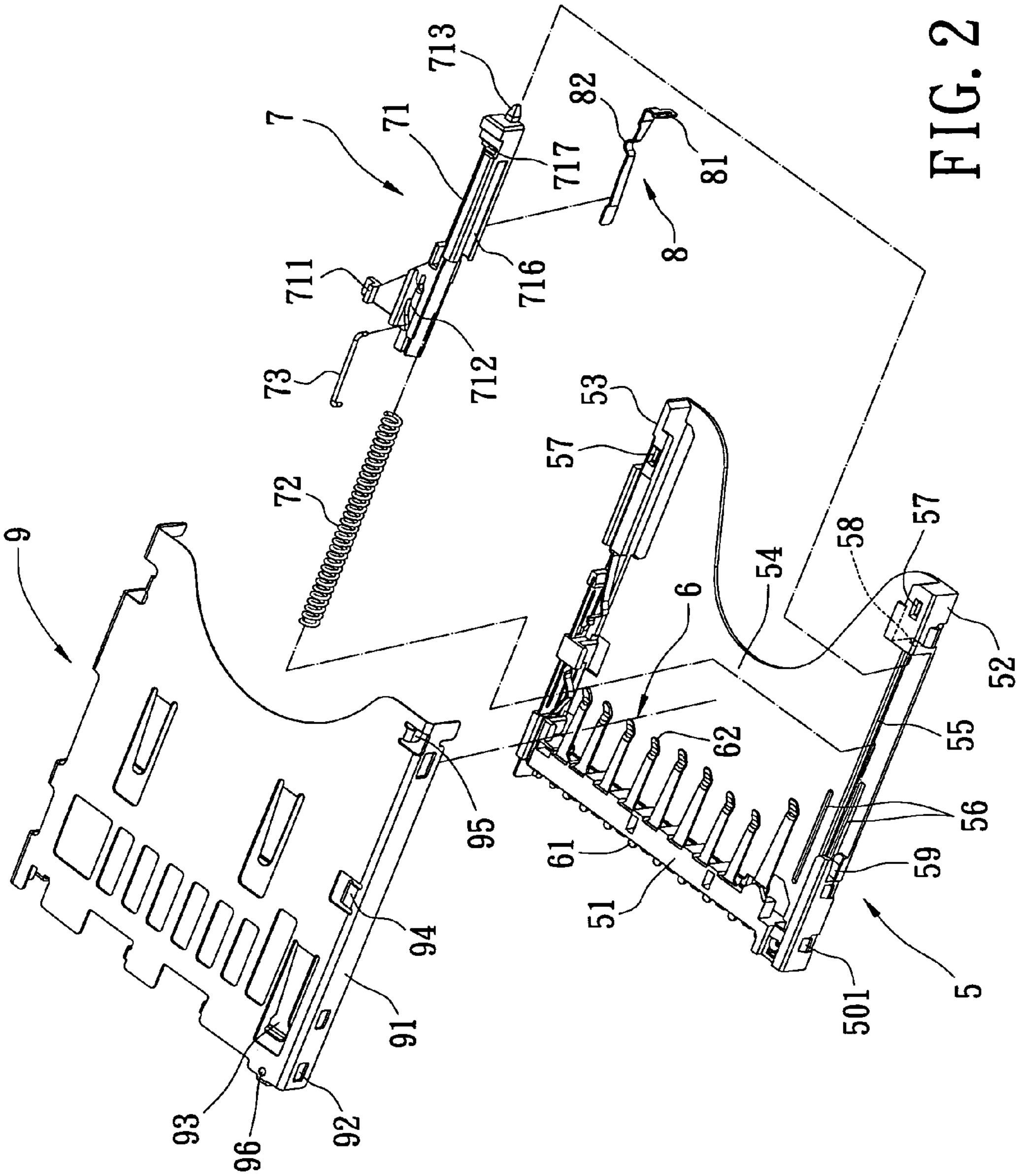
FIG. 2 is an exploded, perspective view of an electrical card connector according to the present invention.
Figure 3:
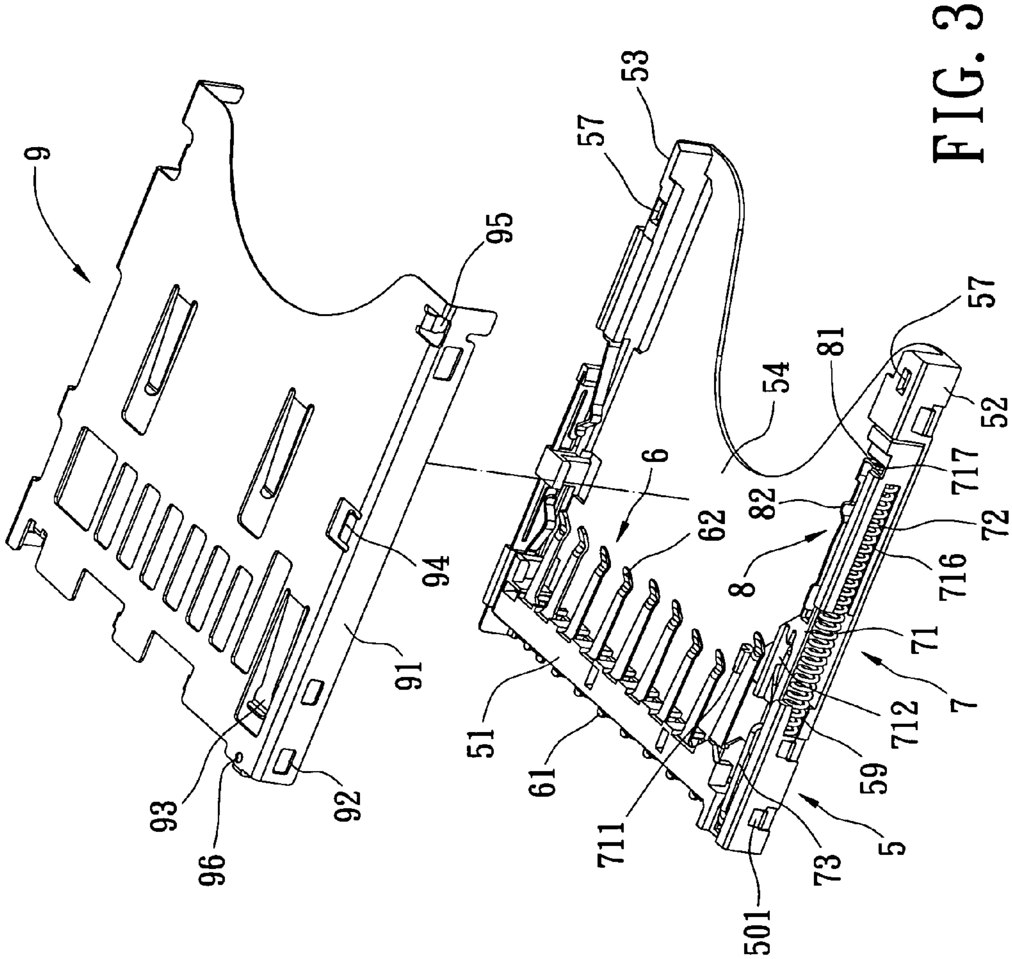
FIG. 3 is an assembled view of the electrical card connector illustrated in FIG. 2, in which a shielding member is not attached thereto.
Figure 4:
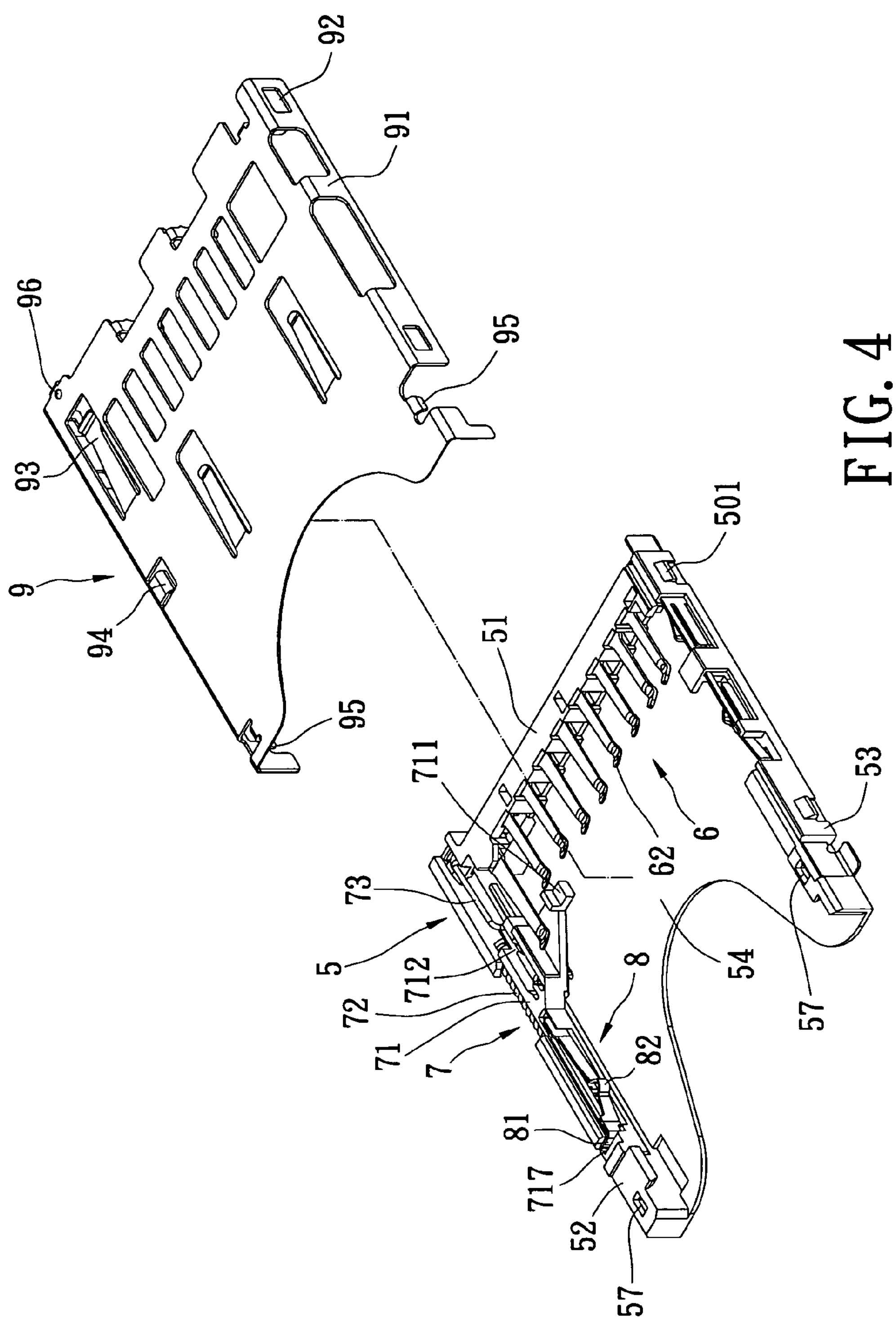
FIG. 4 is an assembled view, from another angle, of the electrical card connector illustrated in FIG. 2, in which a shielding member is not attached thereto.

Referring to FIGS. 2–4, an electrical card connector used for receiving or ejecting an electrical card in accordance with the present invention is shown. The electrical card connector comprises an insulating housing 5, a plurality of conductive terminals, an ejector 7, a spring switch 8, and a shielding member 9. The insulating housing 5 is made of plastic material, and includes a base portion 51, a first side arm 52 and a second side arm 53 parallel extending from two ends of the base portion 51. The first side arm 51 and the second side arm 52 both are formed in a discontinuous style in this embodiment, but can also be formed in a continuous style. The base portion 51, the first side arm 52, and the second side arm 53 form a receiving cavity 54 therebetween for retaining electrical cards. The insulating housing 5 has a guide rib 55 adjacent to the first side arm 52, and two longitudinal slots 56 disposed at opposite sides of the guide rib 55, respectively. The guide rib 55 and the longitudinal slots 56 extend in a direction in which the electrical cards are inserted or ejected. The first side arm 52 and the second side arm 53 have engaging holes, which are formed in a top of the side arms 52 and 53 adjacent to a front end thereof.

The conductive terminals 6 are made of conductive elastic metal material. The conductive terminals 6 are alternatingly located on the base portion 51 of the insulating housing 5 and extend in the direction in which the electrical card is inserted or ejected. Each of the conductive terminals 6 includes a soldering portion 61 extending from a bottom portion of the insulating housing 5 for electrically connecting to a PCB (not shown), and a contact portion 62 extending through into the receiving cavity 54 for electrically connecting to the electrical cars introduced therein.

Figure 6:
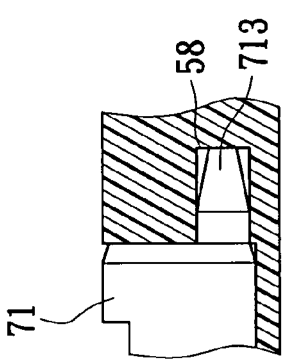
FIG. 6 is an isometric, assembled view of the present invention, in which a protrusion of the slider is mated with a groove of an insulating housing.

The ejector 7 is engaged with the insulating housing 5. The ejector 7 includes a slider 71, a spring 72, and a guide rod 73. The slider 71 is slideably mated with the first side arm 52 of the insulating housing 5 in a front-to-back direction. The slider 71 has push button 711 extending from a inner side thereof and through the receiving cavity 54 to abut against the electrical card in order to push the slider 7. The slider 71 includes a slider groove 712 formed on a top portion thereof for controlling the sliding track of the slider 71. The slider 71 has a protrusion 713 formed at a front end thereof, and the insulating housing 5 has a groove 58 corresponding to the protrusion 713 for retaining the protrusion 713 (shown in FIG. 6). This configuration can guide the slider 71 to slide stably in a front-to-back direction.

Figure 5:
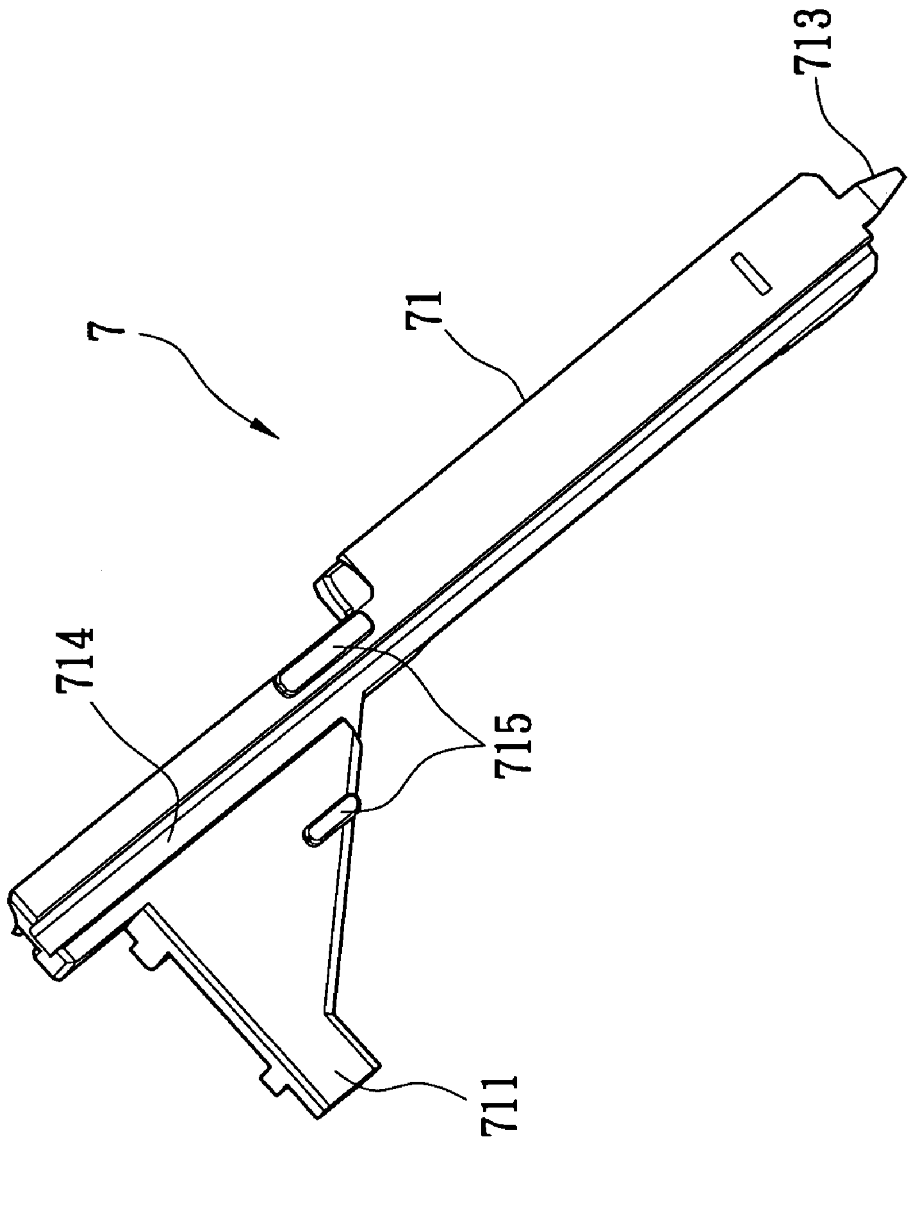
FIG. 5 is a perspective view of a slider of the electrical card connector in accordance with the present invention.
Figure 7:
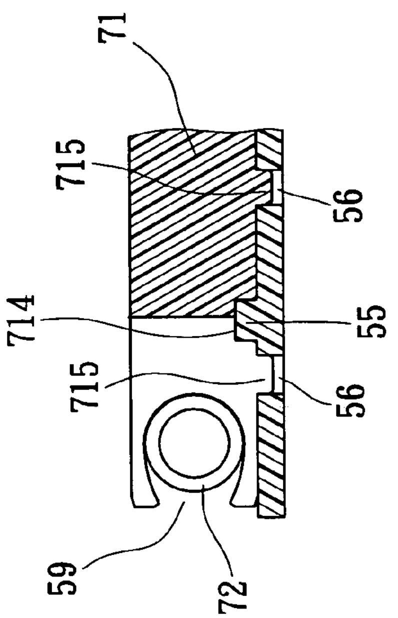
FIG. 7 is an isometric, assembled view of the present invention, in which a guide groove of the slider is mated with a guide rib of the insulating housing.

Moreover, the slider 71 has a guide groove 714 (shown in FIG. 5 and FIG. 7) formed on the bottom thereof, which corresponds to the guide rib 55. Two protruding blocks 715 are disposed at both sides adjacent to the guide groove 714 corresponding to the longitudinal slots 56, respectively. The guide groove 714 and the protruding block 715 mate with the corresponding guide rib 55 and longitudinal slot 56 respectively so as to guide the slider 71 to slide stably on the insulating housing 5 in a front-to-back direction.

Two ends of the spring 72 are retained by and abut against a retaining groove 716 of the slider 71 and a recess 59 of the first side arm 52 of the insulating housing 5, respectively. The spring 72 is arranged between the slider 71 and the insulating housing 5 in order to direct the force of the compressed spring 72.

The guide rod 73 has a first free end fixed to the insulating housing 5, and a second free end movably mated with the slide groove 712. The guide rod 73 has two sliding tracks for sliding in the slide groove 712 so as to form a mechanism to control insertion or ejection of the electrical cards.

The spring switching 8 is made of elastic metal material, which is L-shaped. The spring switching 8 has a fixing portion 81 and a contact portion 82, in which the fixing portion 81 is engaged in an engaging groove 717 of the slider 71 so as to fix the spring switching 8 to the slider 71. The contact portion 82 extends from the fixing portion 81 and through the receiving cavity 54. The contact portion 82 has one end that moves freely.

The shielding member 9 is made of metal material, and is mounted on the insulating housing 5. The shielding member has two side edges 91 extending from ends thereof, respectively, and each of the side edges 91 includes a plurality of mating holes 92. The insulating housing 5 further includes a plurality of fasteners 501 disposed both outside the first and second side arms 52 and 53 corresponding to the mating holes 92. The mating holes 92 fasten with the fasteners 501, respectively, so as to assemble the shielding member 9 and the insulating housing 5.

Figure 8:
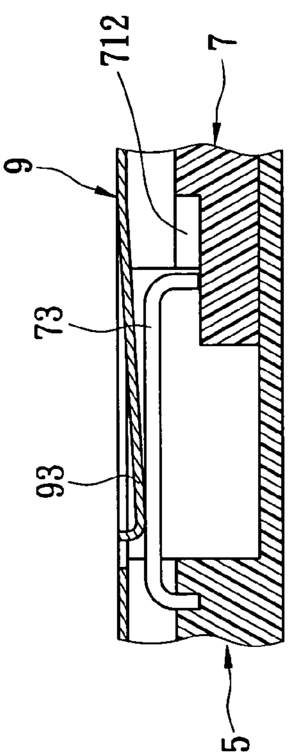
FIG. 8 is an isometric view of the present invention, in which a latch abuts against a top margin of a guide rod.

The shielding member 9 has a latch 93 and retaining point 96 disposed above the guide rod 73. The latch 93 has a free end, which extends downwardly into an inner side of the shielding member 9. After assembly, the latch 93 abuts against a top portion of the guide rod 73 (shown in FIG. 8). The retaining point 96 extends downwardly so as to abut against a top portion of the first free end of the guide rod 73 for limiting an upward displacement thereof.

Figure 9:
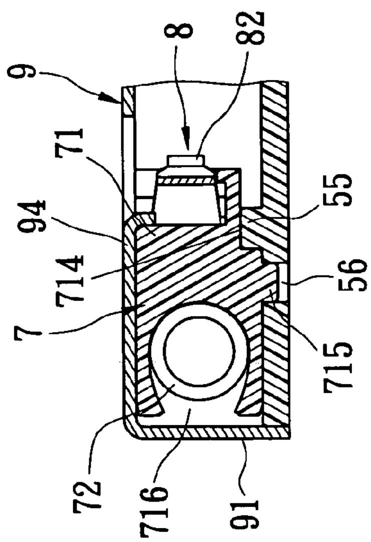
FIG. 9 is an isometric view of the present invention, in which a tab abuts against a top margin of the slider.

The shielding member 9 also has an L-shaped tab 94 disposed above the slider 71. The tab 94 elastically compresses the top portion of the slider 71 (shown in FIG. 9) for limiting an upward or right-and-left displacement thereof.

The shielding member 9 also has an L-shaped tab 94 disposed above the slider 71. The tap 94 elastically compresses the top portion of the slider 71 (shown in FIG. 9) for limiting an upward or right-and-left displacement thereof.

The shielding member 9 further comprises two engaging tabs 95 extending downwardly into inner side of the shielding member 9 engaging with the corresponding engaging hole 57 of the first and second side arms 52 and 53 so as to fully assemble the electrical card connector.

When an electrical card (not shown) is inserted, the electrical card is pushed forward into the receiving cavity 54. Then, the electrical card compresses the push button 711 so as to push the slider 71. Meanwhile, the guide rod 73 slides in the slide groove 712 so as to retain the electrical card. After that, the conductive portion of the electrical card is electrically connected to the PCB of the electrical card connector by connecting to the contact portions 62 of the conductive terminals 6.

For ejection, the electrical card is pushed in the inserting direction. The electrical card compresses the push button 711 and pushes the slider 71. The guide rod 73 moves out of the guide groove 712, and the slider 71 disengages the electrical card under force of the compressed spring switching 8.

According to the foregoing description, compared with the conventional electrical card connector, the electrical card connector according to the present invention has the following advantages:

First, the shielding member 9 introduced therein includes a tab 94, for abutting against a top of the guide rod 73 so as to limit an upward displacement of the guide rod 73. Moreover, the guide groove 714 of the slide rod 73 is mated with the guide rib 55 of the insulating housing 5 so as to make the slider 71 slide stably on the insulating housing 5. This configuration can prevent the guide rod 73 from shaking up and down. The electrical card thus can be pushed stably and smoothly according to the guide rod 73.

Second, the contact portion 82 of the spring switching 8 abuts against the electrical card so as to fix the electrical card reliably. The electrical card is thus securely fixed.

Third, the shielding member has two engaging tabs thereon, which are engaged with the latching holes 57 of the side arms 52 and 53. This assembly provides the electrical card connector with a stable configuration so as to prevent the side arms 52 and 53 from expanding or distorting while inserting or ejecting the electrical card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:

an insulating housing comprising a receiving cavity, wherein the insulating housing comprises a guide rib;

a plurality of conductive terminals retained in the insulating housing;

an ejector comprising a slider, a spring, and a guide rod, the slider slideably mating with the insulating housing along a front-to-back direction, wherein the slider has a slide groove therein, a guide groove in a bottom portion thereof, and a push button extending from an inner side thereof into the receiving cavity, the guide groove slideably engages with the guide rib, the spring is introduced between the insulating housing and the slider, the guide rod is fixed to the insulating housing, and one end of the guide rod is movably mated with the slide groove;

a spring switching fixed to the slider and extending into the receiving cavity; and a shielding member mounted on the insulating housing, wherein the shielding member comprises a tab abutting against a top portion of the slider.

2. The electrical card connector as claimed in claim 1, wherein the insulating housing further comprises a base portion, a first side arm and a second side arm, and the first side arm and the second side arm connect with ends of the base portion, respectively, so as to form a receiving cavity therebetween.

3. The electrical card connector as claimed in claim 2, wherein the first side arm and the second side arm each comprise an engaging hole disposed in a front portion thereof, respectively, the shielding member further comprising two engaging tabs inserted into corresponding engaging holes.

4. The electrical card connector as claimed in claim 1, wherein each of the conductive terminals includes a soldering portion extending from the insulating housing and a contact portion extending through to the receiving cavity.

5. The electrical card connector as claimed in claim 1, wherein the shielding member further comprises two side edges extending from ends thereof, respectively, and each of the side edges includes a plurality of mating holes, the insulating housing comprising a plurality of fasteners disposed at both outside thereof corresponding to the mating holes, and the fasteners engaging with the mating holes, respectively.

6. The electrical card connector as claimed in claim 1, wherein the spring switching is L-shaped and comprises a fixing portion and a contact portion, wherein the fixing portion is fixed to the slider, and the contact portion is retained in an inner portion of the slider and extends into the receiving cavity.

7. The electrical card connector, comprising:

an insulating housing including a receiving cavity and a guide rib, the insulating housing further including two slots respectively disposed at two sides of the guide rib;

a plurality of conductive terminals retained in the insulating housing;

an ejector including a slider, a spring, and a guide rod, the slider slideably mating with the insulating housing along a front-to-back direction, the slider having a slide groove therein and a guide groove in a bottom portion thereof, the guide groove being slideably engaged with the guide rib, the spring being introduced between the insulating housing and the slider, the guide rod being fixed to the insulating housing, and one end of the guide rod being movably mated with the slide groove, the slider further including two protruding blocks disposed at both sides of the guide groove, and the protruding blocks being respectively slideably mating with the slots;

a spring switching fixed to the slider and extending into the receiving cavity; and a shielding member mounted on the insulating housing, wherein the shielding member comprises a tab abutting against a top portion of the slider.

* * * * *